G. E. PREDOCK & C. E. ANDERSON.
PRESSURE REGULATING DEVICE.
APPLICATION FILED DEC. 13, 1910.
1,016,519.
Patented Feb. 6, 1912.
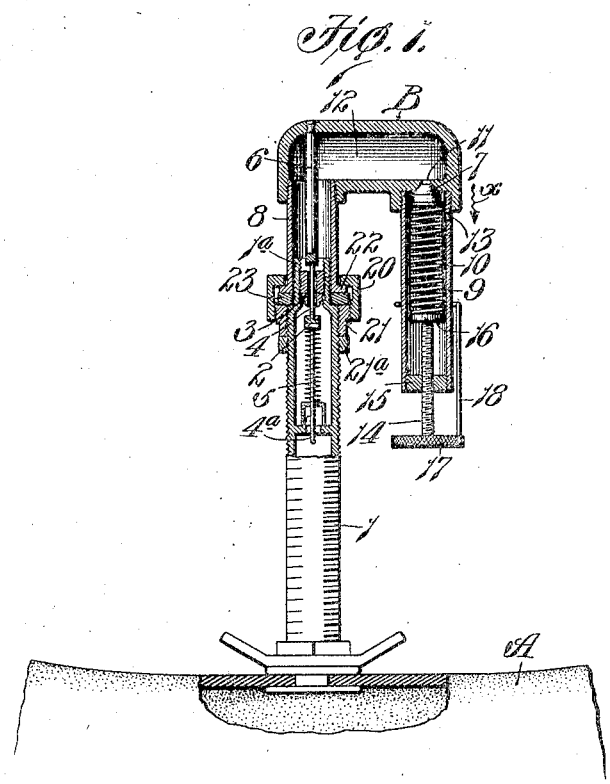
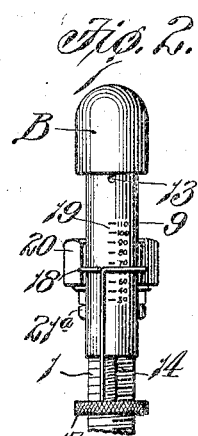
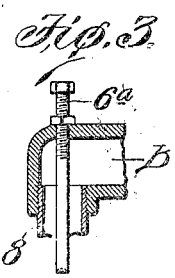
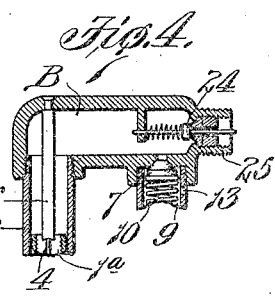
Witnesses:
Geo. R. Redson
Nells L. Church
Inventors,
George E. Predock
Charles E. Anderson.
By Paul Bakewell Atty.

UNITED STATES PATENT OFFICE.

GEORGE E. PREDOCK AND CHARLES E. ANDERSON, OF ST. LOUIS, MISSOURI.

PRESSURE-REGULATING DEVICE.

1,016,519.

Specification of Letters Patent.

Patented Feb. 6, 1912.

Application filed December 13, 1910. Serial No. 597,147.

*To all whom it may concern:*

Be it known that we, GEORGE E. PREDOCK and CHARLES E. ANDERSON, both citizens of the United States, residing at St. Louis, Missouri, have invented a certain new and useful Improvement in Pressure-Regulating Devices, of which the following is a full, clear, and exact description, such as will enable others skilled in the art to which it appertains to make and use the same.

This invention relates to pressure-regulating devices, and particularly to those that are adapted to be used on pneumatic tires.

One object of our invention is to provide an efficient pressure-regulating device for pneumatic tires which is so designed that it projects only a short distance from the rim of the wheel on which the tire is used.

Another object is to provide a pressure-regulating device of simple construction that is composed of only a few metallic parts. And still another object is to provide an inexpensive pressure-regulating device for pneumatic tires that can be installed easily and which is so constructed that it accurately indicates the pressure of the air in the tire.

Figure 1 of the drawings is a vertical sectional view illustrating an ordinary pneumatic tire provided with a pressure-regulating device constructed in accordance with our invention; Fig. 2 is a righthand elevational view of the parts shown in Fig. 1; Fig. 3 is a detail view illustrating a slight modification that can be made in the structure shown in Fig. 1; and Fig. 4 is a detail vertical sectional view of another modification of our invention.

In Fig. 1 we have shown an ordinary pneumatic tire provided with our improved pressure-regulating device. Referring to said figure, A designates the inner tube of the tire, 1 designates the "valve-stem" or valve-carrying member that is connected to said inner tube and which is provided at its outer end with a reduced externally screw-threaded portion 1ª to which the air pump can be attached, and 2 designates the air valve that coöperates with a seat on the under side of a cap 3 which is mounted in the reduced portion of the valve-carrying member 1, said valve being provided with a plunger 4 that passes upwardly through an air port in the cap 3 and also a plunger 4ª that passes through a guideway and on which a coiled expansion spring 5 is mounted so as to hold said valve seated.

To convert a tire of the construction above described into a pressure-regulated tire that cannot burst or blow out on account of excessive pressure inside of the tire, we equip the tire with means 6 for holding the air valve 2 unseated and also a pressure-regulating valve 7 that opens automatically when the pressure inside of the tire exceeds a certain degree, said means and pressure-regulating valve being carried by a device B that is detachably connected to the valve-carrying member 1 which carries the air valve 2. In the embodiment of our invention shown in Fig. 1, the device B consists of a substantially inverted U-shaped hollow member whose leg 8 is arranged in alinement with the valve-carrying member 1, and whose leg 9 receives a coiled expansion spring 10 that holds the pressure-regulating valve 7 seated, said valve being arranged in a seat on the under side of a wall that closes the upper end of the leg 9 and in which a port 11 is formed, as shown in Fig. 1. The means which holds the air valve 2 unseated consists of a pin 6 that is mounted on the device B in such a manner that it strikes the upper end of the plunger 4 of the air valve and depresses same when the device B is arranged in operative position, thereby permitting the air to flow into the air chamber 12 in the device B. If the pressure in the tire or in the air chamber 12 exceeds the force of the spring 10, the pressure-regulating valve 7 will open automatically in the direction indicated by the arrow *x* in Fig. 1 and thus permit some of the air to escape into the hollow leg 9 of the device B and thence through the port 13 in said leg to the atmosphere.

Means is provided for varying the force or strength of the spring 10 so as to enable the pressure in the tire to be controlled or varied to any desired degree, the means shown in Fig. 1 for adjusting the spring 10 consisting of a screw 14 mounted in a cap 15 that closes the lower end of the leg 9, and provided at its upper end with a follower 16 on which the spring 10 rests. The cap 15 is preferably screwed into the lower end of the leg 9 or connected thereto in such a manner that it can be removed so as to enable the spring 10 and pressure-regulating valve 7 to be renewed or repaired, and the screw or adjusting device 14 is preferably provided with a head 17 so as to enable it to be turned easily. To aid the operator in adjusting the spring 10 so as to vary the force of same we have provided the device with a gage which, in the embodiment of our invention shown in Fig. 1, consists of a movable pointer 18 that coöperates with graduations 19 on the outer surface of the leg 9, said pointer having a ring-shaped part that loosely surrounds the leg 9, and a shank depending from said ring-shaped part and bearing upon the upper side of the head 17 on the adjusting screw 14. When said screw is turned in one direction the pointer will travel upwardly over the graduations 19, and when said screw is turned in the opposite direction said pointer will travel downwardly over the graduations. Any suitable means may be used, however, for indicating the strength of the spring 10 so that we do not wish it to be understood that our invention is limited to the structure herein shown.

Any suitable means may be used for connecting the device B to the valve-carrying member 1 of the tire. One means that is both efficient and of simple construction consists of a union 20 screwed onto a collar or flange 21 on the valve-carrying member 1 and projecting over a flange 22 on the lower end of the leg 8 of the device B and a washer or gasket 23 arranged between the collar 21 and the flange 22 so as to produce a tight joint.

A tire that is equipped with a pressure-regulating device of the construction above described cannot burst or blow out on account of abnormal pressure inside of the tire for when the pressure exceeds the force of the spring 10 the valve 7 will open automatically and thus permit some of the air to escape through the port 13 to the atmosphere. If the tire is designed to carry 80 lbs. pressure the user adjusts the screw 14 so as to set the pointer 18 on the numeral "80" of the scale or graduated surface of the device, and then if the air in the tire becomes heated and expands when the tire is in service, the valve 7 will open automatically when the pressure exceeds 80 lbs. and thus permit sufficient air to escape to reduce the pressure to 80 lbs. Consequently, our invention overcomes one of the most objectionable features of pneumatic tires, namely, blow-outs caused by the heating of the air in the tire and the resultant increase of pressure above that which the tire is designed to carry or withstand. The device B is, of course, removed when the tire is being inflated but as soon as the device is again applied or arranged in operative position on the valve-carrying member 1 the pressure in the tire will be reduced automatically to the degree indicated by the gage in case too much air has been forced into the tire during the operation of inflating same.

The device B can be applied easily to any of the different types of pneumatic tires now in general use without changing the air valve of the tire, by simply removing the dust-cap from the upper end of the valve-carrying member 1 and securing the leg 8 of the device to said member by means of the union 20 and the collar 21 which can be screwed onto the upper end of the member 1 and locked in position by means of the jam nut 21ª.

If desired, the means which trips the air valve 2 or holds it unseated, can be made adjustable so as to enable said air valve to be thrown into service without removing the device B from the valve-carrying member 1, such a structure being illustrated in Fig. 3, in which the reference character 6ª designates an adjustable air valve tripping member that can be moved into and out of engagement with the upper end of the plunger 4 on the air valve.

Another slight modification that can be made in the device B is the addition of an air valve 24, and an externally screw-threaded collar 25, as shown in Fig. 4, to which a pump or inflating machine can be attached, thereby enabling the tire to be inflated without removing the device B from the valve-carrying member 1.

While we have herein shown our invention embodied in a device that is adapted to be applied to the "valve-stem" or valve-carrying member now universally used on pneumatic tires, we do not wish it to be understood that our device is limited to use on pneumatic tires for it could be used for various other purposes.

One of the chief advantages of our device over similar devices which have heretofore been used is that it is compact and projects such a short distance from the wheel rim that it is not apt to be broken or damaged. Another desirable feature is that the air escapes directly into the atmosphere without first passing through a long winding passageway; and still another desirable feature is the simplicity and low cost of manufacture, the device being composed of only a few metal parts which are not apt to break or get out of repair.

Having thus described our invention, what we claim as new and desire to secure by Letters Patent is:

A pressure-regulating device for pneumatic tires consisting of a substantially inverted U-shaped member adapted to be arranged in the vertical plane in which the tire lies with one of its legs in alinement with the valve-carrying member of the tire, means arranged in said leg for holding the valve of said valve-carrying member unseated, a wall extending across the other leg of said inverted U-shaped member in which a port is formed, an outwardly opening valve for closing said port, and a spring arranged under said valve for holding it seated.

In testimony whereof, we hereunto affix our signatures, in the presence of two witnesses, this ninth day of December, 1910.

GEORGE E. PREDOCK.
CHARLES E. ANDERSON.

Witnesses:
WELLS L. CHURCH,
GEORGE BAKEWELL.